United States Patent
Oukassi et al.

(10) Patent No.: US 9,882,183 B2
(45) Date of Patent: Jan. 30, 2018

(54) METHOD FOR PRODUCING A LITHIUM MICROBATTERY

(71) Applicant: COMMISSARIAT À L'ENERGIE ATOMIQUE ET AUX ENERGIES ALTERNATIVES, Paris (FR)

(72) Inventors: Sami Oukassi, Saint-Egrève (FR); Raphaël Salot, Lans-en-Vercors (FR); Steve Martin, Saint-Sauveur (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/022,450

(22) PCT Filed: Sep. 16, 2014

(86) PCT No.: PCT/FR2014/052307
§ 371 (c)(1),
(2) Date: Mar. 16, 2016

(87) PCT Pub. No.: WO2015/036720
PCT Pub. Date: Mar. 19, 2015

(65) Prior Publication Data
US 2016/0226032 A1    Aug. 4, 2016

(30) Foreign Application Priority Data
Sep. 16, 2013   (FR) ..................................... 13 02149

(51) Int. Cl.
*H01M 10/04* (2006.01)
*H01M 6/40* (2006.01)
(Continued)

(52) U.S. Cl.
CPC ........... *H01M 2/029* (2013.01); *H01M 2/026* (2013.01); *H01M 2/0277* (2013.01); *H01M 2/06* (2013.01);
(Continued)

(58) Field of Classification Search
None
See application file for complete search history.

(56) References Cited

U.S. PATENT DOCUMENTS 6,168,884 B1    1/2001   Neudecker et al.
2004/0029311 A1   2/2004   Snyder et al.
(Continued)

FOREIGN PATENT DOCUMENTS

WO    01/73873 A1    10/2001
WO    2005/067645 A2    7/2005

OTHER PUBLICATIONS

Mar. 22, 2016 International Preliminary Report on Patentability issued in International Patent Application No. PCT/FR2014/052307.
(Continued)

*Primary Examiner* — Yoshitoshi Takeuchi
(74) *Attorney, Agent, or Firm* — Oliff PLC

(57) ABSTRACT

The fabrication method of a lithium microbattery provides for use of a substrate successively covered by: a cathode, a solid electrolyte, and a first electrically conducting layer made from a material configured to combine with the lithium atoms. The first layer is devoid of contact with the cathode. The method further includes formation of a second electrically conducting layer configured to form a diffusion barrier for the lithium atoms. The second layer is electrically connected to the first layer and leaves at least a part of the first layer uncovered, the part being facing the electrolyte. Electrochemical deposition of a lithium anode is then per-
(Continued)

formed from germination from the first and second electrically conducting layers.

11 Claims, 4 Drawing Sheets

(51) Int. Cl.

| | |
|---|---|
| *H01M 6/18* | (2006.01) |
| *H01M 2/02* | (2006.01) |
| *H01M 2/06* | (2006.01) |
| *H01M 4/04* | (2006.01) |
| *H01M 4/134* | (2010.01) |
| *H01M 4/1395* | (2010.01) |
| *H01M 4/66* | (2006.01) |
| *H01M 4/70* | (2006.01) |
| *H01M 10/052* | (2010.01) |
| *H01M 10/0562* | (2010.01) |
| *H01M 10/0585* | (2010.01) |
| *H01M 4/38* | (2006.01) |
| *H01M 10/0525* | (2010.01) |

(52) U.S. Cl.
CPC ......... *H01M 4/045* (2013.01); *H01M 4/0461* (2013.01); *H01M 4/134* (2013.01); *H01M 4/1395* (2013.01); *H01M 4/382* (2013.01); *H01M 4/661* (2013.01); *H01M 4/667* (2013.01); *H01M 4/70* (2013.01); *H01M 6/40* (2013.01); *H01M 10/0436* (2013.01); *H01M 10/052* (2013.01); *H01M 10/0525* (2013.01); *H01M 10/0562* (2013.01); *H01M 10/0585* (2013.01); *H01M 2220/30* (2013.01); *H01M 2300/0068* (2013.01)

(56) References Cited

U.S. PATENT DOCUMENTS

2005/0147877 A1* 7/2005 Tarnowski .......... H01M 2/0207
  429/162
2012/0177998 A1   7/2012 Ogawa et al.

OTHER PUBLICATIONS

Oukassi, Sarni et al., "Microfabrication process for patterning metallic lithium encapsulated electrodes," Applied Surface Science, vol. 2565, (2009); pp. S58-S60.

Okita, Kengo et al., "Stabilizing lithium plating-stripping reaction between a lithium phosphorus oxynitride glass electrolyte and copper thin film by platinum insertion," Journal of Power Sources, vol. 196, (2011), pp. 2135-2142.

Knoops, H. C. M. et al., "Deposition of TiN and TaN by Remote Plasma ALD for Cu and Li Diffusion Barrier Applications," Journal of the Electrochemical Society, vol. 155, No. 12, (2008), pp. G287-G294.

Feb. 13, 2015 Search Report issued in International Patent Application No. PCT/FR2014/052307.

* cited by examiner

METHOD FOR PRODUCING A LITHIUM MICROBATTERY

BACKGROUND OF THE INVENTION

The invention relates to formation of a metallic lithium layer, in particular for fabricating a lithium microbattery.

STATE OF THE ART

A lithium microbattery is an electrochemical accumulator implementing $Li^+$ ions and comprising an active stack of thin layers. The active stack is formed by two electrodes, a positive electrode and a negative electrode, separated by a solid electrolyte.

The solid electrolyte is an electric insulator having a strong ionic conductivity, and is generally formed by a lithiated compound. The positive electrode is in addition made from a lithium insertion material, for example lithiated metal oxides.

Lithium microbatteries called "lithium-metal" microbatteries comprise a negative electrode made from metallic lithium. Lithium microbatteries called "lithium-ion" microbatteries further comprise a negative electrode formed by a lithium intercalation or insertion material.

Lithium microbatteries are particularly interesting on account of their high mass density and their low toxicity. However, a lithium microbattery, in particular the solid electrolyte and the negative electrode, is very sensitive to air and to moisture. Particular attention therefore has to be paid to the different fabrication and encapsulation steps of a lithium microbattery.

For fabrication of microbatteries, a conventional technique consists in successively depositing the thin layers of the microbattery, in particular by vacuum deposition techniques.

The lithium-based layers are highly reactive and very chemically unstable. The presence of lithium, and in certain cases of sulphur, in the thin layers forming a microbattery does in fact give these layers a highly hygroscopic nature and a chemical instability in air. Lithium-based thin layers, in particular metallic lithium layers, are therefore difficult to structure.

Structuring of a metallic lithium layer is generally performed using shadow masking. Vacuum deposition, for example PVD (Physical Vapor Deposition), can be performed through a shadow mask presenting recesses. The mask is placed on the substrate and held in position during the deposition period. The shadow mask is then removed and the substrate presents the required patterns. This masking technique generates particle contamination, and the shadow mask can also scratch the layer on which it is deposited, thereby being liable to greatly damage the microbattery. Furthermore, when the size of the microbattery is small, the shadow masking can generate edge effects which prove detrimental for satisfactory operation of the microbattery.

Furthermore, the document ["Microfabrication process for patterning metallic lithium encapsulated electrodes", Applied Surface Science 256S (2009) S58-S60] discloses a metallic lithium layer structuring technique by lift-off. This technique consists in full wafer depositing a layer of PPX (PPX standing for poly-para-xylylene) with a thickness of 20 μm on a silicon-based substrate comprising a $SiO_2/Si_3N_4$ stack. The PPX layer is etched to define cavities opening onto the $Si_3N_4$ layer. Then deposition by evaporation of the metallic lithium on the substrate is performed. Finally, the PPX layer is removed manually to transfer metallic lithium patterns onto the substrate, in particular onto the $Si_3N_4$ layer. This technique does however remain difficult to implement. Furthermore, the PPX layer etching and removal steps are critical steps which are liable to contaminate the substrate. This can be detrimental for example for satisfactory operation of a microbattery and for its fabrication method.

OBJECT OF THE INVENTION

The object of the invention is to provide a fabrication method of a lithium microbattery that is easy to implement, is compatible with fabrication technologies and methods in the microelectronics field, and enables a high-performance and reliable microbattery to be obtained.

This object tends to be achieved by providing a fabrication method of a lithium microbattery comprising the following successive steps:
  providing a substrate successively covered, and in order, by a cathode, a solid electrolyte, and a first electrically conducting layer made from a first material, the first layer being devoid of contact with the cathode;
  forming a second electrically conducting layer configured to form a diffusion barrier for the lithium atoms, the second layer being electrically connected to the first layer and leaving at least a part of the first layer uncovered, said part being facing the electrolyte;
  electrochemically depositing a lithium anode from germination from the first and second electrically conducting layers so as to form a film comprising lithium and the first material with the first layer.

According to an improvement, the first material is chosen such that the film, comprising lithium and the first material, forms the interface between the solid electrolyte and the anode.

Furthermore, said film is preferentially made from an alloy formed by lithium and atoms of the first material.

According to a preferred embodiment, the method comprises a formation step of a first hermetic and electrically insulating encapsulation layer on a portion of the second layer so as to prevent electrochemical deposition.

In advantageous manner, the electrolyte is provided with lateral flanks connected by a substantially parallel surface opposite to the substrate, and the first layer is arranged on the substrate and on the electrolyte so as to cover in continuous manner said lateral flanks and said surface joining the latter.

The method can in advantageous manner comprise one or more other steps, either alone or in combination, in particular among the following steps:
  formation of a second hermetic and electrically insulating encapsulation layer coating the anode and the electrolyte;
  formation of a second layer covering a portion of the first layer, said portion being arranged on the substrate;
  use of a first layer made from a material from the list comprising doped silicon, doped germanium, Sn, Al, Au and Pt;
  formation of the second layer made from a material from the list comprising Ti, Ni, W, and Mo, Cr or from an alloy of these elements;
  formation of an anode having a thickness greater than twice the thickness of the first layer, preferably greater than 10 times the thickness of the first layer;
  formation of an anode and of a first layer having thicknesses chosen such that the first material of the first layer is consumed to form the film comprising lithium and the first material, the film separating the electrolyte and the anode.

One of the objects of the invention tends to be accomplished by also providing a lithium microbattery provided with a substrate successively covered, and in order, by a cathode, a solid electrolyte, a first electrically conducting layer made from a material configured to combine with the lithium atoms, the first layer being devoid of contact with the cathode. The microbattery further comprises a second electrically conducting layer configured to form a diffusion barrier for the lithium atoms. This second layer is electrically connected to the first layer so as to leave at least a part of the first layer uncovered. Furthermore, the uncovered part of the first layer is arranged in such a way as to be facing the electrolyte. The microbattery is also provided with an area of the second layer configured to form a contact connection of the microbattery, and a lithium anode arranged on the first and second electrically conducting layers so as to leave said area of the second layer uncovered.

Advantageously, the microbattery comprises a first hermetic and electrically insulating encapsulation layer arranged on the second layer so as to separate said area from the first layer and from the anode.

In preferential manner, the microbattery further comprises a second hermetic and electrically insulating encapsulation layer coating the anode.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED EMBODIMENTS OF THE INVENTION

Figure 1:
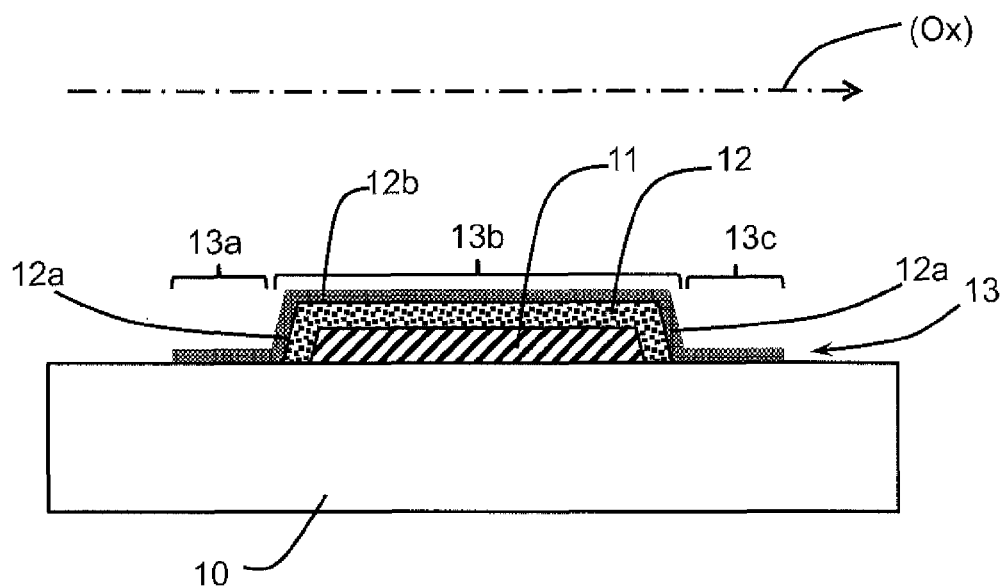
FIGS. 1 and 2 represent successive steps of fabrication of a metallic lithium layer of a microbattery according to a first embodiment, in schematic manner, in cross-section.

As illustrated in FIGS. 1 to 4, a fabrication method of a lithium microbattery comprises the use of the substrate provided with a stack of active layers. In fact, the method comprises a first step consisting in providing a substrate 10 successively covered, in the following order, by a cathode 11, a solid electrolyte 12 which is preferably lithium-based, and a first electrically conducting layer 13 (FIG. 1). The first layer is made from a first material.

Preferentially, the first layer 13 is made from a material configured to combine with the lithium atoms. In other words, the atoms of the first material and the lithium atoms form an alloy. The notion of an alloy is to be interpreted in the broad sense of the term as being a mixture of atoms which are not necessarily in interaction with one another. Furthermore, the first layer 13 is devoid of contact with the cathode 11.

The layers forming the cathode 11 and the solid electrolyte 12 can be made successively on the substrate 10 by conventional techniques used in the microelectronics industry, for example by Physical Vapor Deposition (PVD), vacuum evaporation deposition, or Chemical Vapor Deposition (CVD). The thickness of the thin layers 11 and 12 can vary between a few nanometres and a few tens of micrometres.

Furthermore, the substrate 10 is generally a silicon wafer able to comprise an integrated circuit. The substrate 10 can also be made from glass or from ceramic. The substrate 10 can be covered by a passivation layer, typically made from silicon oxide, or by a bilayer formed by a silicon oxide layer and a silicon nitride layer. The substrate 10 can also form the cathode 11.

What is generally meant by cathode 11 is an electrode generating $Li^+$ ions or containing a lithium insertion material. The material used as active material of the cathode 11 can be a non-lithiated material such as a vanadium oxide ($V_xO_y$), tungsten oxide ($WO_x$), or molybdenum oxide ($MoO_x$) or a titanium oxysulphide ($TiO_xS_y$). The material of the cathode 11 can also be a lithiated material such as a lithium and cobalt oxide ($LiCoO_2$), a lithium and manganese oxide ($LiMn_2O_4$), or a lithium and titanium oxide ($Li_4Ti_5O_{12}$), an iron and lithium phosphate ($LiFePO_4$) or a lithium and nickel oxide ($LiNiO_2$), etc.

Furthermore, the substrate 10 can also comprise other thin layers, in particular layers forming current collectors of the microbattery. Conventionally, these current collectors are formed by metallic layers, for example made from platinum, chromium, gold, titanium, etc. The fabrication steps of these current collectors is independent from the formation step of the stack of active layers on the substrate 10. In other words, the current collectors of the microbattery can be fabricated before, during, or after the formation step of the cathode 11 and of the solid electrolyte 12.

As illustrated in FIG. 1, the solid electrolyte layer 12 is arranged on the cathode 11 so as to cover the latter. In preferential manner, the electrolyte 12 coats the cathode 11. The electrolyte 12 is made from a material enabling conduction of lithium ions $Li^+$. Preferentially, the material of the solid electrolyte 12 is lithium-based and it is electrically insulating. The solid electrolyte 12 can be made from boron and lithium oxynitride 12 (LiBON), from silico-phosphate and lithium oxynitride (LiSiPON), etc. In preferential manner, the solid electrolyte 12 is made from phosphorus and lithium oxynitride (LiPON) called "lipon".

The first layer 13 is arranged on the solid electrolyte 12 so that it is devoid of contact with the cathode 11. The first layer 13 covers the solid electrolyte 12, and it preferentially extends along a longitudinal axis (Ox) so as to cover the solid electrolyte 12 longitudinally.

According to a preferred embodiment, the solid electrolyte 12 is provided with lateral flanks 12a joined by a surface 12b opposite the substrate 10 and preferentially substantially parallel thereto. The first layer 13 preferentially comprises a portion 13a arranged directly on the substrate 10. According to this preferred embodiment, the first layer 13 is advantageously arranged on the substrate 10 and on the electrolyte 12 so as to cover in continuous manner said lateral flanks 12a and said surface 12b joining the latter.

In other words, as represented in FIG. 1, the first layer 13 extends longitudinally and comprises in continuous and successive manner a first portion 13a arranged on the substrate 10, a second portion 13b arranged on the solid electrolyte 12, and a third portion 13c arranged on the substrate 10.

Advantageously, the first layer 13 is made from a material from the list comprising tin (Sn), aluminium (Al), gold (Au), platinum (Pt), doped silicon, and doped germanium. In other words, the first material comprises atoms of tin (Sn), aluminium (Al), gold (Au), platinum (Pt), or a first layer 13 is a layer of doped silicon or of doped germanium. Preferentially, the layer 13 has a thickness ranging from 5 to 50 nm. The first layer 13 can be formed by means of any known technique compatible with the materials of the different layers arranged on the substrate 10. The first layer 13 can be deposited selectively or on the whole surface of the substrate 10. The layer 13 can be deposited for example by PVD, CVD, evaporation, etc. Furthermore, patterning of the layer 13 can be performed using a photolithography step or any other means.

Figure 2:
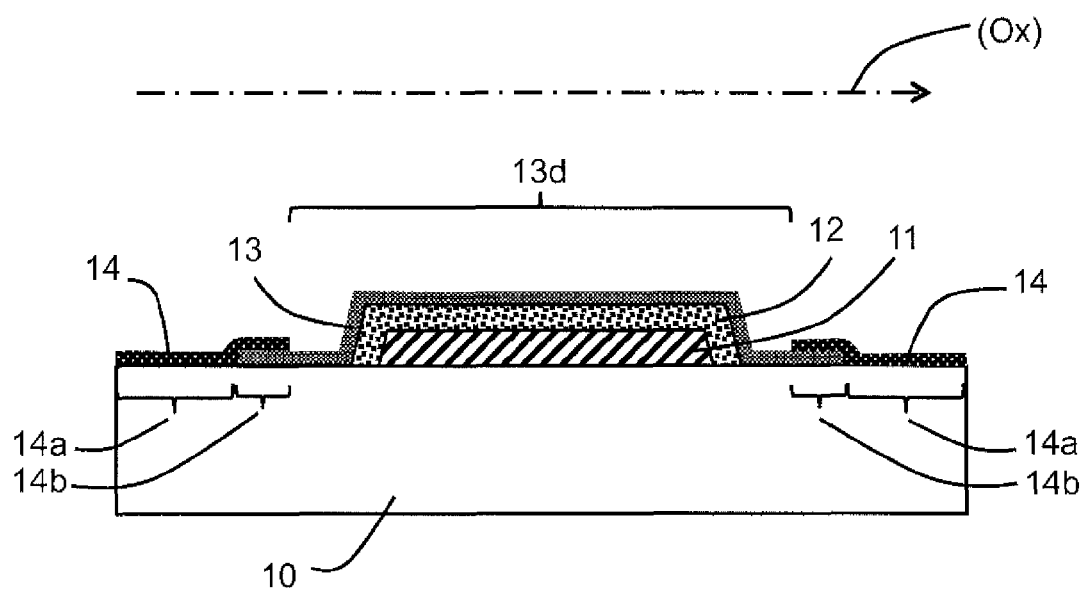
Figure 6:
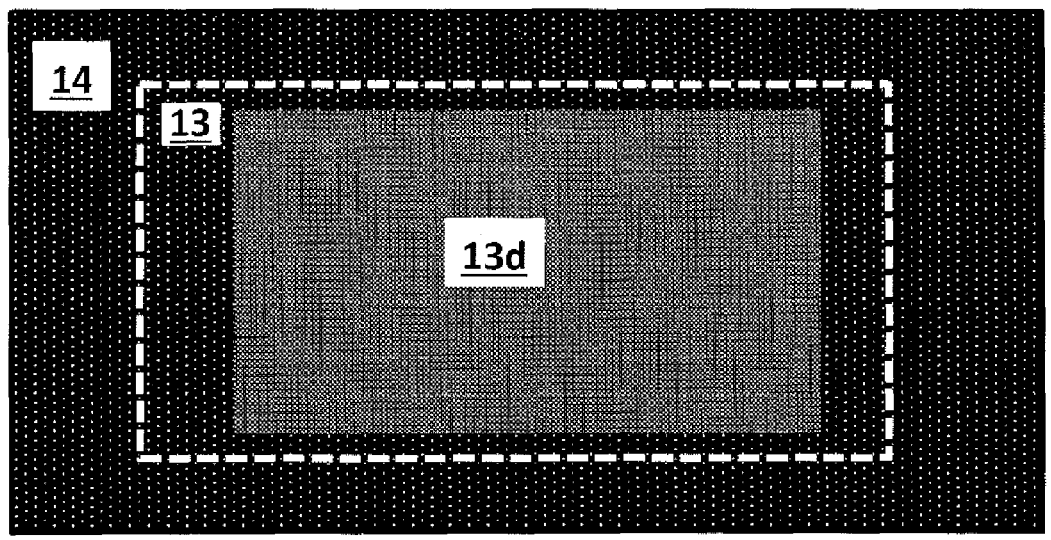
FIGS. 6 and 7 respectively represent top views corresponding to FIGS. 2 and 3, in schematic manner.

The fabrication method further comprises a formation step of a second electrically conducting layer 14 (FIGS. 2 and 6). The material of the second layer 14 and its arrangement are chosen such that the layer 14 is configured to form a diffusion barrier for the lithium atoms. In other words, layer 14 is configured to prevent diffusion of the lithium atoms or ions originating in particular from the solid electrolyte 12 via the first layer 13.

For example purposes, the article "Deposition of TiN and TaN by Remote Plasma ALD for Cu and Li Diffusion Barrier Applications", by H. C. M. Knoops et al. published in the Journal of the Electrochemical Society, 155 (12) G287-G294, 2008, discloses a study concerning two electrically conducting layers made from TiN and TaN and their efficiency to block diffusion of lithium. Electrical measurements on test structures respectively comprising layers of 60 nm of TaN and of TiN interposed between a layer of lithium and a silicon substrate were performed. The results of these measurements showed that the lithium atoms pass through the TaN layer and diffuse into the silicon substrate, whereas the lithium atoms were unable to pass through the TiN layer and to enter into the substrate. According to this article, it was shown that a TiN layer represents a diffusion barrier for lithium atoms, preventing lithium atoms from passing through said TiN layer.

Furthermore, a TaN layer, deposited under the experimental conditions of the article, was not able to block diffusion of the lithium atoms and to form a diffusion barrier for the lithium atoms.

The second layer 14 is also arranged so as to be electrically connected to the first layer 13. In other words, the first 13 and second 14 layers are in direct contact.

Advantageously, the second layer 14 is made from a material from the list comprising titanium (Ti), nickel (Ni), tungsten (W) and molybdenum (Mo). The layer 14 can also be made from an alloy formed from one or more elements from the previous list. The second layer 14 can be deposited, for example by PVD, CVD, evaporation, etc. The second layer 14 can furthermore be deposited selectively or full wafer on the substrate 10, and patterning of this layer can be performed using a photolithography step or any other conventional technique. Preferentially, the layer 14 has a thickness ranging from 10 to 500 nm.

Furthermore, the second layer 14 is arranged so as to leave at least a part 13d of the first layer 13 uncovered. The uncovered part 13d is facing the solid electrolyte 12.

In advantageous manner, the second layer 14 covers a portion of the first layer 13, said portion being arranged on the substrate 10. In other words, this covering part is formed by a stack: second layer 14/first layer 13/substrate 10.

According to a preferred embodiment illustrated in FIG. 2 and in FIG. 6 (a top view of FIG. 2), the second layer 14 comprises a first portion 14a arranged directly on the substrate 10 and a second portion 14b covering the first portion 13a and/or the second portion 13b of the first layer 13.

Figure 3:
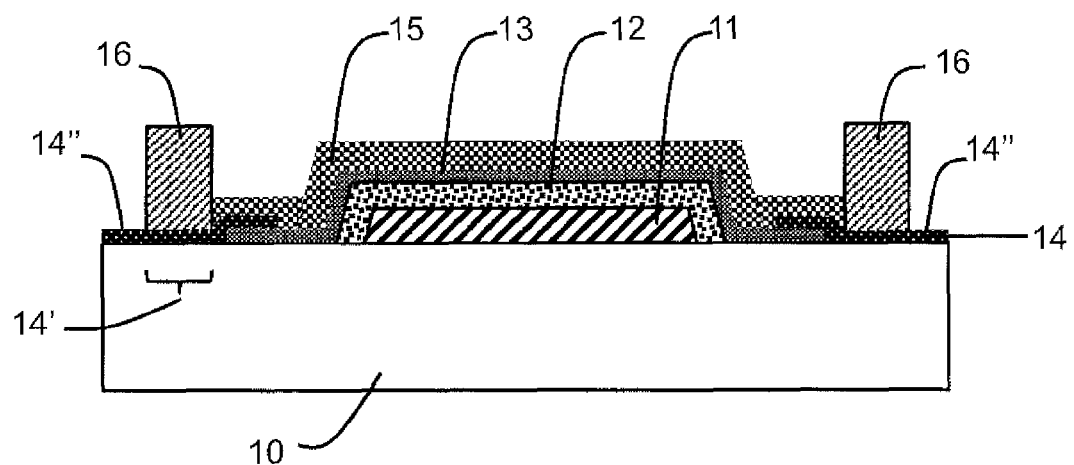
FIGS. 3 and 4 represent two other embodiments of a lithium microbattery, in schematic manner, in cross-section.
Figure 5:
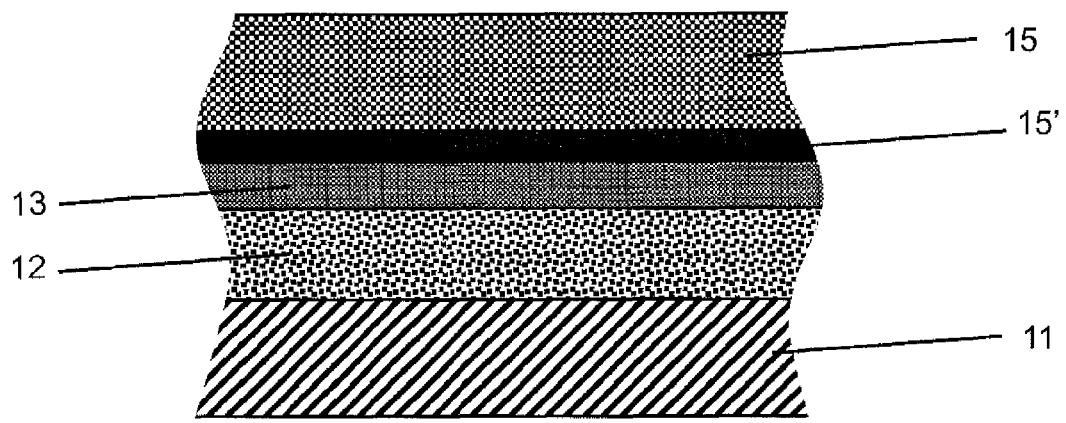
FIG. 5 represents an enlargement of a stack fabricated according to the embodiment of FIG. 3, in schematic manner, in cross-section.

As illustrated in FIG. 3, the method comprises an electrochemical deposition step of a lithium anode 15. As illustrated in FIGS. 3 and 5, the deposition is performed from germination from the first 13 and second 14 electrically conducting layers so as to form with the first layer 13 a film 15' comprising lithium and the first material of the layer 13.

Preferentially, the first material of the first layer 13 is chosen so that the film 15' forms the interface between the solid electrolyte 12 and the lithium anode 15. In other words a stack is obtained successively comprising the solid electrolyte 12, the film 15' and the lithium anode 15.

Advantageously, the film 15' formed after deposition of the anode 15 is made from an alloy formed by lithium and atoms of the first material.

Furthermore, what is meant by alloy is a mixture of lithium atoms and atoms of the first material of the first layer 13. The lithium atoms of said mixture participate in the migration movements during operation of the microbattery fabricated by the method. The lithium atoms of said alloy, in other words comprised in the film 15', are active and are not blocked in this alloy.

According to an exemplary embodiment, the germination layers 13 and 14 are respectively made from tin and titanium. The tin layer 13 has a thickness of about 50 nm, and the titanium layer 14 has a thickness of about 250 nm. Furthermore, according to this exemplary embodiment, the lithium anode 15 is made using an electrodeposition bath comprising a solvent constituted by ethylene carbonate and dimethyl carbonate in equal volume ratio (EC-DMC 1:1), and a hexafluorophosphate lithium salt (LiPF6 1M). The current density applied in the bath is comprised between 0.5 and 2 mA/cm$^2$.

In advantageous manner, the thickness of the lithium anode 15 is twice, and more advantageously 10 times greater than the thickness of the first layer 13.

Preferentially, the thickness of the anode 15 is chosen according to the material of the first layer 13 and to its thickness. According to the binary diagram of the selected system (lithium, anode material 15/material of the first layer 13), in other words according to the material of the layer 13, the thickness of the anode 15 and the thickness of the first layer 13 are chosen such that the anode 15/electrolyte 12 interface is formed by a lithium-first layer material 13 alloy. According to an advantageous embodiment, the thickness of the anode 15 and the thickness of the first layer 13 are chosen such that the first material of the first layer 13 is consumed to form the film 15' separating the solid electrolyte 12 from the lithium anode 15. In other words, the film 15' constitutes an interface between the electrolyte 12 and the anode 15.

According to the exemplary embodiment, the thickness of the lithium anode 15 is about 5 µm for a thickness of 50 nm of the tin layer 13. The choice of thicknesses of these layers and of the material of layer 13 enabled formation of a lithium-tin alloy with a mass percentage of lithium of about 88%.

Figure 7:
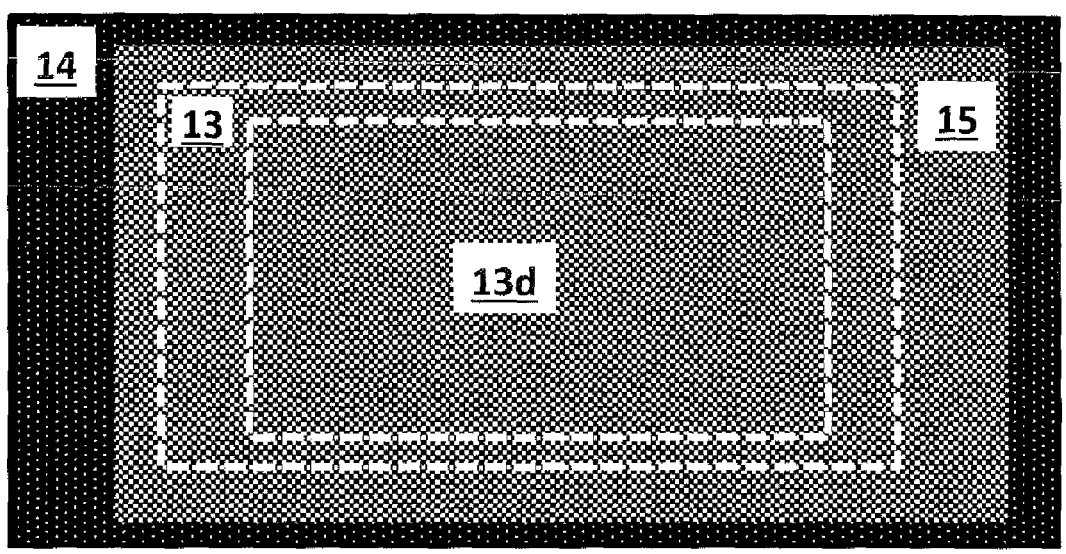

According to a preferred embodiment illustrated in FIGS. 3 and 7, a formation step of a first hermetic and electrically insulating encapsulation layer 16 is performed on a portion 14' of second layer 14. The layer 16 is not represented in FIG. 7. This step is performed before electrochemical deposition so that the first encapsulation layer 16 prevents deposition of the anode layer 15 on said portion 14' of layer 14.

The main object of the encapsulation layer 16 is the formation of an inert and tight protection barrier for the active layers of the microbattery. Furthermore, the encapsulation layer 16 advantageously enables patterning of the lithium anode 15 by preventing electrochemical deposition on one or more portions of the second layer 14.

The encapsulation layer 16 can be formed by different materials having electric, thermomechanical and chemical characteristics compatible with the components and the operation of the microbattery. For example purposes, the encapsulation layer 16 can be an epoxy layer, or a polymer layer formed by acrylate epoxy, or a layer of oxide or alumina, etc. depending on the nature of the encapsulation layer 16, it can be formed by spin coating or by PVD, etc.

The second layer 14 can thus form or comprise an electric contact connection of the microbattery made on the substrate 10 while preventing migration of the lithium atoms to said contact connection. In preferential manner, such a contact connection is formed in an area 14" of the second layer 14 separated from the active layers of the microbattery (cathode 11/electrolyte 121 anode 15) by the first encapsulation layer 16.

A presence of the lithium atoms in non-encapsulated areas of the microbattery, in particular said contact connection, can lead to oxidation of the lithium or of the alloy containing it, thereby damaging these areas. For example, oxidation of the lithium at the level of the electric contacts of the microbattery can result in an increase of the contact resistance, or even in complete breakdown of the latter. The astute nature and arrangement of the second layer 14 thus enable a reliable microbattery having a good electrochemical operation and a good efficiency to be fabricated.

Figure 4:
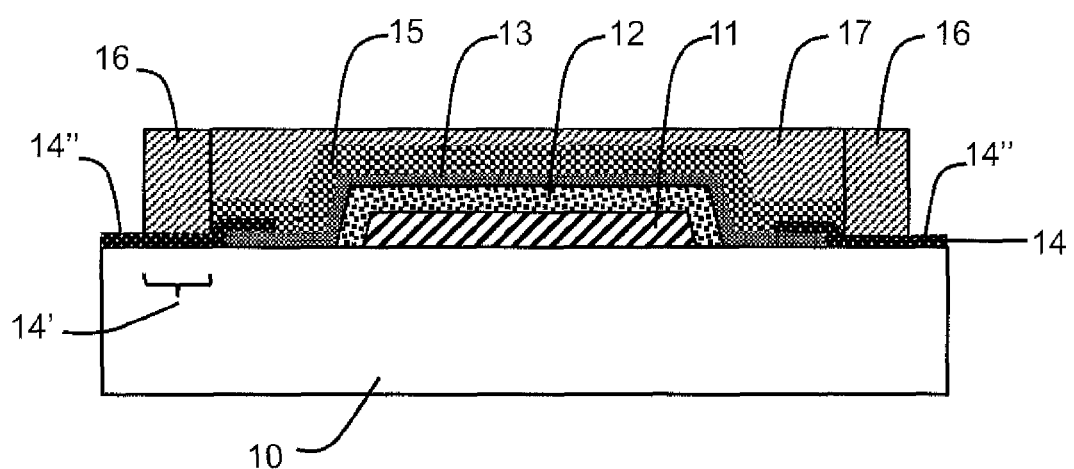

According to another embodiment illustrated in la FIG. 4, a second hermetic and electrically insulating encapsulation layer 17 is formed on the stack comprising the anode 11, cathode 15 and electrolyte 12. The layer 17 is formed so as to coat the anode 15 and electrolyte 12. Thus, the first 16 and second 17 encapsulation layers advantageously form an encapsulation of the microbattery made on the substrate 10.

Furthermore, the first 16 and second 17 encapsulation layers can be overlaid by an additional encapsulation layer. In particular when a polymer encapsulation layer is deposited directly on the microbattery components, an additional layer is generally used. Polymer materials can in fact be permeable to certain contaminants which can react with the active layers of the microbattery, which requires the addition of an additional layer forming a shield against contaminants.

The fabrication method described above is advantageously a method that is easy to perform enabling the cost and complexity of fabrication of microbatteries on a large scale to be reduced. The method in particular enables patterning of the lithium anode without having recourse to use of a hard mask or another technique that is difficult to implement.

The method in fact uses two electrically conductive germination layers to perform an electrochemical deposition of the lithium anode in efficient and easy manner. Furthermore, the method in advantageous manner enables patterning of the lithium anode that is easy to perform by partially depositing an electrically insulating encapsulation layer on one of the two germination layers before electrochemical deposition of the lithium anode. Furthermore said encapsulation layer also forms a protection for the microbattery.

The method astutely uses a germination layer presenting a diffusion barrier for the lithium atoms, for deposition of the lithium anode and formation of a contact connection of the microbattery. Due to the diffusion barrier formed by the germination layer, said contact connection prevents contamination generated by migration of the lithium atoms. The method thus enables fabrication of reliable microbatteries having a good electrochemical operation and a good efficiency.

Indeed, to increase the degree of performance and the reliability of a lithium microbattery, insulation of the active layers from the other components of the microbattery is considered as being one of the key points. This object tends to be achieved by providing a lithium microbattery having an arrangement of components preventing in particular migration of the lithium atoms from the active to the non-encapsulated areas, for example the electric contact connections of the microbattery.

According to an embodiment illustrated in FIG. 3, a lithium microbattery is provided with a substrate 10 successively covered by: a cathode 11, a solid electrolyte 12 preferably made from lithium, and a first electrically conducting layer 13 made from a material configured to combine with the lithium atoms. The first layer 13 is devoid of contact with the cathode 11.

Furthermore, the microbattery comprises a second electrically conducting layer 14 advantageously configured to form a diffusion barrier for the lithium atoms. The second layer 14 is furthermore electrically connected to the first layer 13 so as to leave at least a part 13*d* of the first layer 13 uncovered. The uncovered part 13*d* is arranged so as to be facing the electrolyte 12.

The microbattery also comprises a lithium anode 15 arranged on the first 13 and second 14 electrically conducting layers so as to leave an area 14" of the second layer 14 uncovered. The area 14" further comprises an electric contact of the microbattery arranged so as to be distinct from the anode.

In advantageous manner, the lithium microbattery comprises a first hermetic and electrically insulating encapsulation layer 16 arranged on the second layer 14 so as to separate said area 14" from the first layer 13 and from the anode 15. This astute arrangement of the area 14", designed to comprise a contact connection of the microbattery, and of the active layers advantageously enables migration of the lithium atoms from the stack of active layers to the contact connection area 14". Such a migration is detrimental for the reliability and correct operation of the microbattery.

As illustrated in FIG. 4, the lithium microbattery further comprises a second hermetic and electrically insulating encapsulation layer 17 coating the anode 15. The encapsulation layers 16 and 17, and the special arrangement of area 14", advantageously enable an efficient encapsulation of the active layers of the microbattery and insulation of the non-encapsulated area 14" designed to comprise a contact connection of the microbattery.

The invention claimed is:

1. A fabrication method of a lithium microbattery, comprising the following successive steps:
    providing a substrate successively covered, and in order, by:
        a cathode;
        a solid electrolyte;
        a first electrically conducting layer made from a first material, the first layer being devoid of contact with the cathode;
    forming a second electrically conducting layer configured to form a diffusion barrier for the lithium atoms, the second electrically conducting layer being electrically connected to the first layer and leaving at least an uncovered part of the first layer, said uncovered part being facing the electrolyte;

electrochemically depositing a lithium anode from germination from the first electrically conducting layer and the second electrically conducting layer so as to form with the first electrically conducting layer a film comprising lithium and the first material.

2. The method according to claim 1, wherein the first material is chosen such that the film comprising lithium and the first material forms the interface between the solid electrolyte and the lithium anode.

3. The method according to claim 1, wherein the film comprising lithium and the first material is made from an alloy formed by lithium and atoms of the first material.

4. The method according to claim 1, comprising a formation step of a first hermetic and electrically insulating encapsulation layer on a portion of the second electrically conducting layer so as to prevent electrochemical deposition.

5. The method according to claim 1, wherein the solid electrolyte is provided with lateral flanks connected by a surface opposite to the substrate, and wherein the first electrically conducting layer is arranged on the substrate and on the solid electrolyte so as to cover in continuous manner said lateral flanks and said surface joining the lateral flanks.

6. The method according to claim 1, wherein a second hermetic and electrically insulating encapsulation layer coats the anode and the solid electrolyte.

7. The method according to claim 1, the second electrically conducting layer covers a portion of the first electrically conducting layer arranged on the substrate.

8. The method according to claim 1, wherein the first electrically conducting layer is made from a material from the list comprising Sn, Al, Au and Pt, doped silicon, and doped germanium.

9. The method according to claim 1, wherein the second electrically conducting layer is made from a material from the list comprising Ti, Ni, W, Cr and Mo.

10. The method according to claim 1, wherein the lithium anode has a thickness greater than twice the thickness of the first layer.

11. The method according to claim 1, wherein the thickness of the lithium anode and the thickness of the first electrically conducting layer are chosen such that the first electrically conducting material is consumed to form the film separating the solid electrolyte and the lithium anode.

* * * * *